United States Patent [19]

La Garcia et al.

[11] Patent Number: 5,508,865
[45] Date of Patent: Apr. 16, 1996

[54] HEAD GUIDE ASSEMBLY PROVIDING CRITIAL ALIGNMENTS AND IMPROVED RESANANCE RESPONSE

[75] Inventors: Joe La Garcia; Adolfo M. Guzman; Paul Y. Hu; Alex I. Panasiuk; Arthur F. Sanford; Loyal K. Whitted, all of Tucson, Ariz.

[73] Assignee: International Business Machines Corporation, Armonk, N.Y.

[21] Appl. No.: 236,836

[22] Filed: May 2, 1994

[51] Int. Cl.$^6$ .............................. G11B 5/56; G11B 21/24
[52] U.S. Cl. .................................................. 360/109
[58] Field of Search .................................. 360/109, 107, 360/106, 129; 24/115 M, 135 R; 403/374, 378

[56] References Cited

U.S. PATENT DOCUMENTS

| | | | |
|---|---|---|---|
| 265,835 | 10/1882 | Lewis | 24/135 R |
| 1,084,379 | 1/1914 | Wile | 403/374 |
| 2,464,620 | 3/1949 | Tinnerman | 24/135 R |
| 3,787,644 | 1/1974 | Schneider | 360/109 |
| 3,882,543 | 5/1975 | Richards | 360/109 |
| 4,131,924 | 12/1978 | Behr et al. | 360/106 |
| 4,158,212 | 6/1979 | Dattilo | 360/109 |
| 4,185,312 | 1/1980 | Bjordahl | 360/106 |
| 4,212,043 | 7/1980 | Baker | 360/104 |
| 4,677,505 | 6/1987 | Nukada et al. | 360/77 |
| 4,833,558 | 5/1989 | Baheri | 360/109 |
| 5,023,861 | 6/1991 | Champagne et al. | 369/215 |
| 5,047,883 | 9/1991 | Aldrich et al. | 360/109 |
| 5,191,495 | 3/1993 | Takahara | 360/106 |
| 5,377,052 | 12/1994 | Guzman et al. | 360/106 |

OTHER PUBLICATIONS

Research Disclosure, Feb., 1985, No. 250, "Magnetic head Mount".
IBM TDB, vol. 27, No. 10A, Mar., 1985, pp. 5705–5706 "Off–Axis Head Alignment–Stage".
P. J. Arseneault, *Field Replaceable, Rotating Head Assembly*, IBM Technical Disclosure Bulletin, vol. 18, No. 2 Jul. 1975, pp. 312–313.
Karol et al, *Field Replaceable Head Mount Assembly With Joy–Stick Mount*, IBM Technical Disclosure Bulletin, vol. 18, No. 1 Jun. 1975, pp. 29–30.
IBM TDB vol. 26 No. 9 Feb. 1984 "Head Mount" pp. 4546–4547 Guzman et al.

*Primary Examiner*—Stuart S. Levy
*Assistant Examiner*—William R. Korzuch
*Attorney, Agent, or Firm*—F. E. Anderson

[57] ABSTRACT

A head guide assembly of a tape device includes a beam for securely mounting a tape head thereon, wherein the tape head is accurately aligned and mounted so as to have both an improved resonance response as well as isolation from external shock or vibrations. A head guide support, made from a super gusseted material, supports the beam and tape head wherein the beam is mounted on a brass base for reducing resonances. The brass base is coupled to the head guide support via a kingpin and wedge clamps for locking the tape head in alignment without affecting the alignment. Additional resonances in a direction of a pitch of the tape head is reduced by further connecting the brass base to the head guide support without distorting the aligned position of the brass base. Shock mounts are provided for floating the head guide assembly from a base of the tape device.

10 Claims, 12 Drawing Sheets

HEAD GUIDE ASSEMBLY PROVIDING CRITIAL ALIGNMENTS AND IMPROVED RESANANCE RESPONSE

FIELD OF THE INVENTION

The present invention relates generally to tape drives, and more particularly, to a tape head guide assembly having a moveable tape head with improved shock isolation and resonance response.

BACKGROUND OF THE INVENTION

Data processing systems, in conjunction with processing data, typically are required to store large amounts of data (or records), which data can be efficiently accessed, modified, and re-stored. While several different mediums of data storage are typically provided within a data processing system (electronic memory, direct access storage devices (DASD), and magnetic tape), magnetic tape has an advantage of reduced cost for very large data storage capabilities, for example, gigabytes of data storage. Tape storage is often used for back-up purposes, that is, data stored on one storage medium is reproduced on magnetic tape for safekeeping. Having a back-up data copy is mandatory for many businesses as data loss could be catastrophic to the business. Large volumes of back-up data, for example, terabytes of data, are generally stored in a tape library, using a robotic picker to select a tape for access to data thereon or for writing back-up data thereto. Increasing the data capacity that can be stored to tape reduces the cost of backing up data and improves library efficiency.

In the information storage industry, increases in tape data capacities have been achieved, in part, by increasing tape lengths stored within a cartridge or reel by producing thinner tape substrates. Additional increases in data capacity are made possible by various data compression techniques, for example, Improved Data Recording Capability (IDRC) by International Business Machines, Company. Data compression techniques can increase data density by two to five times over non-compressed data.

Advances in magnetic tape media and tape head technologies have generated further increases in data capacity by increasing both a number of tracks on a magnetic tape (by narrowing a width of each track) and the number of read/write elements on the tape head. A nine-track tape for data storage has been a standard for many years. More recently, an IBM 3490-E magnetic tape subsystem for 12.7 mm (½ inch) wide tape employs a head element with thirty-six read/write elements and has a tape capacity of 800 megabytes (increasing to two or more gigabytes with data compression). The 3490-E magnetic tape subsystem performs bi-directional linear recording (as opposed to helical scan recording).

A number of tape rewinds is reduced, and performance improved accordingly, by interleaving sets of head elements. In an interleaved head, element pairs having a read-element/write-element configuration (when viewed towards the face of the head) alternate with element pairs having an opposite write-element/read-element configuration, each pair of elements being associated with one track on the tape. When the tape travels in a first direction, the element pairs having one configuration access the corresponding tracks (such as the even numbered tracks) in a read-after-write manner. Conversely, when the tape travels in an opposite direction, those element pairs having the other configuration access the other corresponding tracks (such as the odd numbered tracks), also in a read-after-write manner. Further enhancing performance with such a large number of tracks requires an equally large number of closely spaced elements. The 3490-E tape head is a magneto-resistive transducer formed through thin film deposition techniques.

Historically, the number of tracks that could be established on the tape media has been limited by a number of corresponding elements that could be fabricated on a tape head. As a result, tape drives have been designed to process a tape using a head having fewer sets of read/write elements than a number of tracks on the tape. The tracks are divided into groups, each group containing a same number of tracks as there are read/write element pairs in the head. Accessing all the groups requires indexing the head transversely relative to the tape path, such as with a stepper motor or voice coil driven springs, into a number of discrete positions corresponding to the number of groups of tracks. A head having eight read/write pairs can accommodate a tape having twenty-four tracks if the tracks are divided into three groups of eight tracks each and the head has three index positions. A distance the head travels between index positions is minimized by interleaving the groups. For example, each of the three groups containing eight tracks (consecutively numbered 0–23) results in tracks 0, 3, 6, . . . , and 21 being in the first group and accessible by the head being indexed to position zero. Similarly, tracks 1, 4, 7, . . . , and 22 are in the second group, accessible in index position one, while tracks 2, 5, 8, . . . , and 23 are in the third group, accessible in index position 2.

Despite advances in data capacity, still further increases are desired, such as would be possible with a 12.7 mm wide tape having 64 or even 128 tracks. However, even when a head is indexed, there is a practical limit to the ability of a multi-track head to accurately and reliably record data to and read data from a tape having such a large number of very narrow tracks. Problems can be caused by track mis-registrations, such as tape edge variations, environmental thermal expansion and contraction and inaccuracies in the path the tape follows in a drive, as well as by inaccuracies in the formatting of tracks on the tape itself. Even a minute "wobble" in the tape can result in significant signal degradation, such as crosstalk and dropout, if a 12.7 mm tape has 128 tracks, each with a width of about eighty microns.

Using fixed heads, as in the past, made it easier to deal with track mis-registrations, etc. Now, however, not only are the tracks narrower, but the head is servo-controlled. Thus the head must appear fixed in terms of a home position, while providing excellent accuracy while seroving across track groups. The servo-controlled head must not only be isolated from external shock and vibrations which could cause resonances, and hence track mis-registration, but also must be immune to resonances caused by its own servo-induced motion.

Accordingly it is desired to provide a method and apparatus for accurately aligning a servo-controlled head while minimizing resonances of the servo-controlled head due to shocks/vibrations and head motions.

SUMMARY OF THE INVENTION

An object of the present invention is to provide an improved head guide assembly for a magnetic tape device.

Another object of the present invention is to provide a tape device including a tape head having improved shock/vibration isolation and resonance response.

According to a first embodiment of the present invention, in a tape drive, a method for maintaining critical tape head alignments while reducing resonances to the tape head is provided. The critical tape head alignments include a skew and a wrap angle alignment, wherein the tape head is mounted on a head guide assembly having a tape path. The method comprises steps of: (a) securing the tape head to a rigid yet light weight beam, wherein the rigid beam provides alignment pads for frontal and lateral tape head alignments; (b) movably mounting the rigid beam to a massive base, such that the tape head is movable perpendicular to the tape path; (c) positioning the massive base within a head guide support via a kingpin, the massive base being rotated about the kingpin for aligning the tape head for a skew alignment, and maintaining the skew alignment while locking the massive base in the skew aligned position; (d) aligning the tape head for a wrap angle adjustment by penetrating the kingpin and the massive base relative to the head guide support, and maintaining the wrap angle alignment while locking the kingpin in the wrap angle aligned position; and (e) coupling mechanically, the massive base to the head guide support via an outhouse assembly, the outhouse assembly reducing a pitch resonance relative to said tape head while maintaining the tape head alignments of steps (c) and (d).

In another embodiment of the present invention, a servo controlled magnetic tape head guide assembly for reading data from and/or writing data to a magnetic tape is provided, wherein a magnetic tape head therein is critically aligned for skew and wrap angle and the magnetic tape head guide assembly provides shock isolation and reduced resonances to the magnetic tape head. The magnetic tape head guide assembly includes a massive base member to which a lightweight beam member is movably attached for allowing the magnetic tape head mounted on the lightweight beam member to index perpendicular to a tape path. A head guide support having a super gusseted structure supports a kingpin for rotatably and penetratably mounting the massive base member to the head guide support such that the massive base member is rotated about the kingpin for skew aligning the magnetic tape head, and further penetrating the kingpin within the head guide support for wrap angle aligning the magnetic tape head. A first wedge clamp locks the kingpin to the massive base member, and second wedge clamp locks the kingpin to the head guide assembly.

The foregoing and other objects, features, and advantages of the invention will be apparent from the following more particular description of a preferred embodiment of the invention, as illustrated in the accompanying drawing.

DETAILED DESCRIPTION

Figure 1:
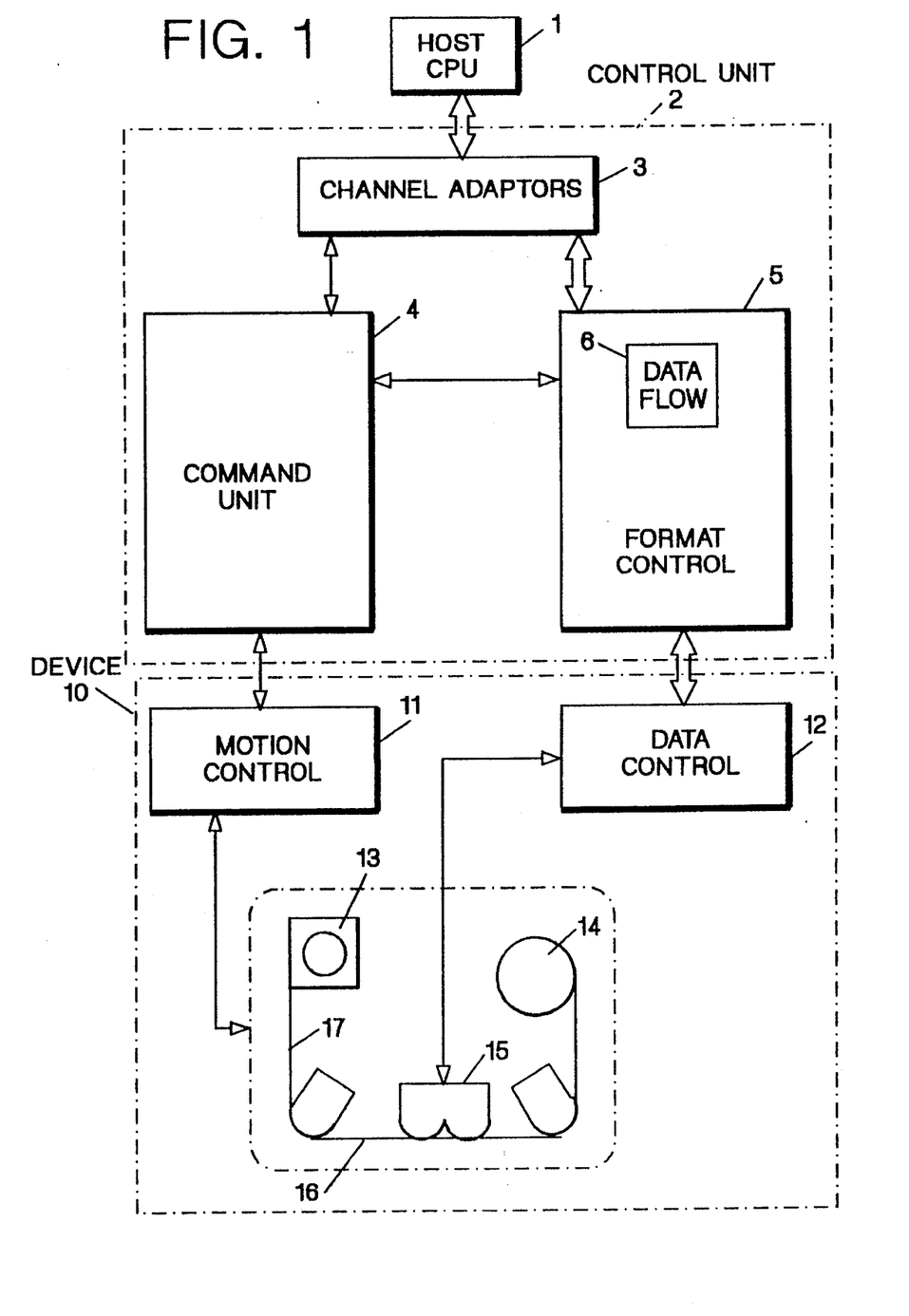
FIG. 1 is a schematic block diagram of a tape system embodying the invention.

Referring more particularly to the drawing, like numerals denote like features and structural elements in the various figures. The invention will be described as embodied in a magnetic tape drive for use in a data processing environment. Turning now to FIG. 1, a data processing system is controlled by at least one host central processing unit (CPU) 1 (such as an IBM System/370 or IBM Enterprise Systems/9000 (ES/9000)) to store, retrieve, and manipulate data. The data processing system includes one or more tape systems. The tape system further includes at least one control unit 2 and at least one magnetic tape recording or playback device 10. The control unit 2 accepts commands and data from the CPU 1 via one or more channel adaptors 3, and controls the device(s) 10 accordingly. The device 10 may be an IBM tape drive (for example, an IBM 3490-E tape drive) which uses a pre-defined data format.

The device 10 includes a motion control 11 for controlling the handling of magnetic tape media, a data control 12 including read and write circuits to operate a magnetic transducing head 15 (hereinafter referred to as head 15), and a tape path 16 (including a tape cartridge 13 having a tape supply reel therein and a tape take-up reel 14) for transporting a magnetic tape 17 past the head 15 for writing data to and reading data from the magnetic tape 17. The data control 12 is coupled to a format control 5 in the control unit 2, which is in turn connected to the channel adaptors 3. Format control 5 further includes a data flow 6 which, among other things, detects End of Block (EOB) marks located on the magnetic tape 17.

The motion control 11 is connected to a command unit 4 in the control unit 2, which is also connected to the channel adaptors 3. The command unit 4 accepts commands from the CPU 1 via the channel adaptors 3 and controls the mechanical operation of the device 10. The command unit 4 further controls the flow of data between the channel adaptors 3 and the magnetic tape 17 via format control 5 and the data control 12.

Figure 2:
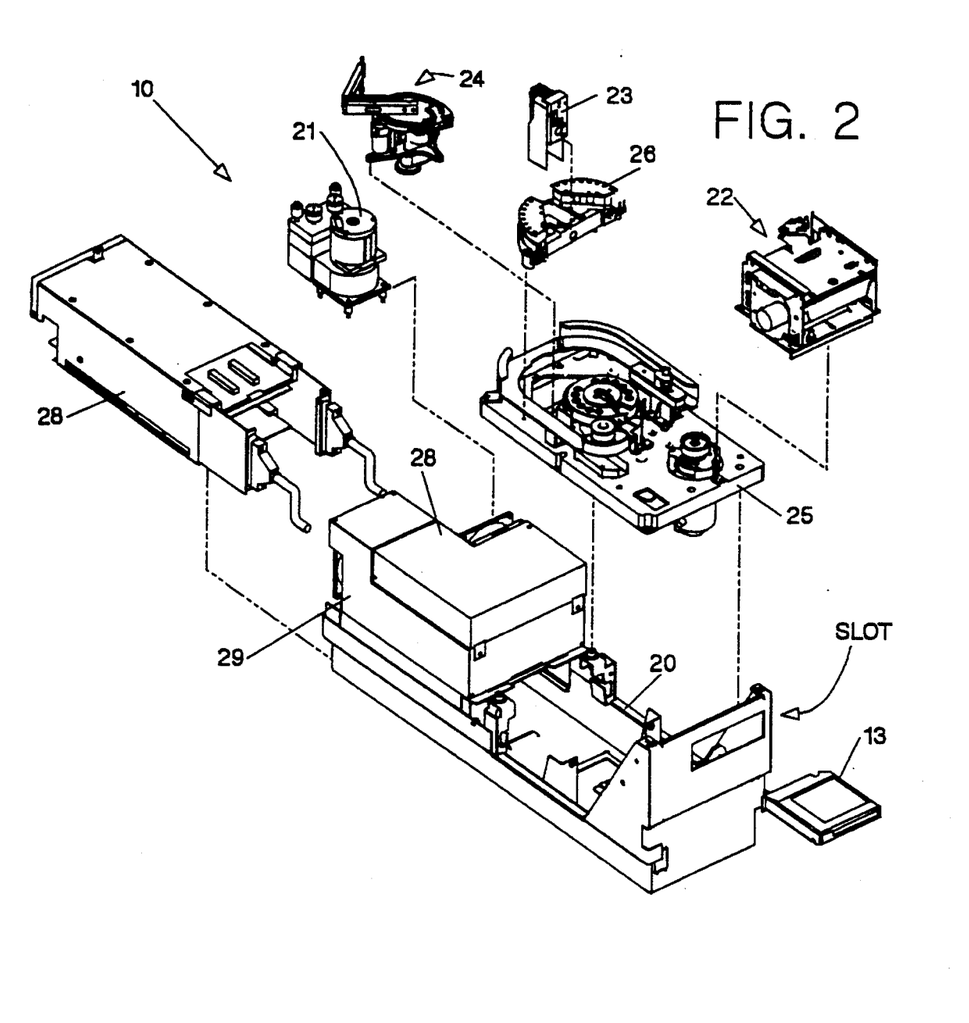
FIG. 2 is an exploded view of a magnetic tape drive according to a preferred embodiment of the present invention.

FIG. 2 illustrates an exploded view of an exemplary magnetic tape drive (device 10) in which the present invention may be incorporated. The device 10 includes a base unit 20 to which are mounted a power supply 29, various electronic circuit cards 28 (such as motion control 11 and data control 12), a deck assembly 25 and a pneumatic assembly 21. Mounted to the deck assembly 25 are a loader mechanism 22, drive motors (not specifically indicated), a pantocam assembly 24, and a "D" bearing assembly 26 (hereinafter referred to as the head guide assembly 26). A head actuator assembly 23 is mounted to the head guide assembly 26. The device 10 can operate in stand alone and automated tape loader environments interconnected with a host computer and can also be incorporated into a multi-drive automated data storage and retrieval system (library).

In operation, a removable tape cartridge 13 having a supply reel wound with magnetic tape 17 is inserted through a slot in a front face of the base unit 20 and into the loader assembly 22. The loader assembly 22 draws the tape cartridge 13 in and lowers the tape cartridge 13 onto the deck assembly 25. The pantocam assembly 24 engages a leader block attached to a free end of the magnetic tape 17 and pulls the magnetic tape around the head guide assembly 26 such that the magnetic tape 17 lays in the tape path 16 (FIG. 1) and across the magnetic tape head 15 mounted to the head actuator assembly 23. The leader block is then engaged by the take-up reel 14 (FIG. 1) on the deck assembly 25 and the device 10 is then ready to record information to or read information from the magnetic tape 17. While the device 10 illustrated in FIG. 2 includes a take-up reel and accepts tape cartridges containing only the supply reel, the present invention is not limited to use with such a drive/cartridge combination but could also be incorporated in other drive/cartridge combinations, such as those in which the tape cartridge contains both supply and take-up reels.

Figure 3:
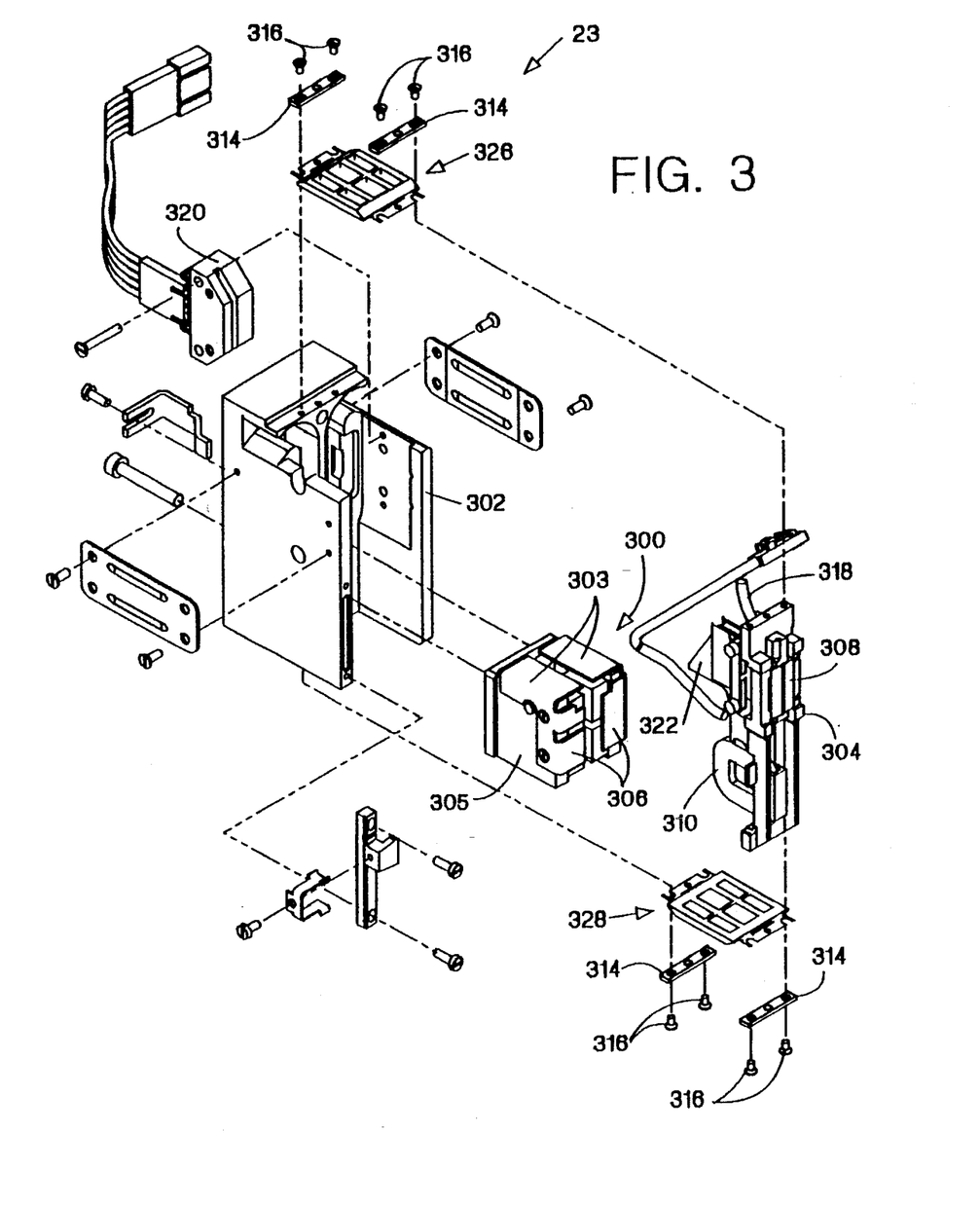
FIG. 3 is an exploded view of the elements of the head actuator assembly according to a preferred embodiment of the present invention.

FIG. 3 is an exploded view of elements making up the head actuator assembly 23. The head actuator assembly 23 includes a base member 302, a beam member 304, and a magnetic assembly 300 made up of a plurality of permanent magnets mounted to the base member 302. The electromagnetic assembly 300 includes shields 306, a keeper 305 and one or more magnets 303. Fastened to the beam member 304, but located between the magnets 303 within a magnetic field produced thereby, is a substantially flat electrical coil 310 (as opposed to a cylindrical voice coil coaxial with a yoke). Mounted to an outer surface of the beam 304 is a multi-track magneto-resistive (MR) transducer 308 (hereinafter referred to as head 308). Interconnecting upper and lower ends of the beam 304 with upper and lower portions of the base member 302 are parallel upper and lower flexures 326 and 328, respectively, secured with brackets 314 and screws 316 (although alternative mounting methods can also be used). The beam member 304 is thus suspended away from the base member 302.

A hose 318 is secured to the beam member 304 to provide air to outlets in the head 308 as a "puffer" device to lift the magnetic tape away from the head 308, thus preventing the magnetic tape 17 from sticking to the head 308 during fast forward and rewind operations. Also preferably incorporated into the actuator assembly 23 is an optical tachometer to provide beam position feedback to the control unit 2 (FIG. 1) during head 308 indexing. The optical tachometer includes an optical sensor 320 mounted to the base member 302 and an associated indexing strip 322 positioned through a slot in the optical sensor 320 and which is mounted to, and moves with, the beam member 304.

Figure 4:
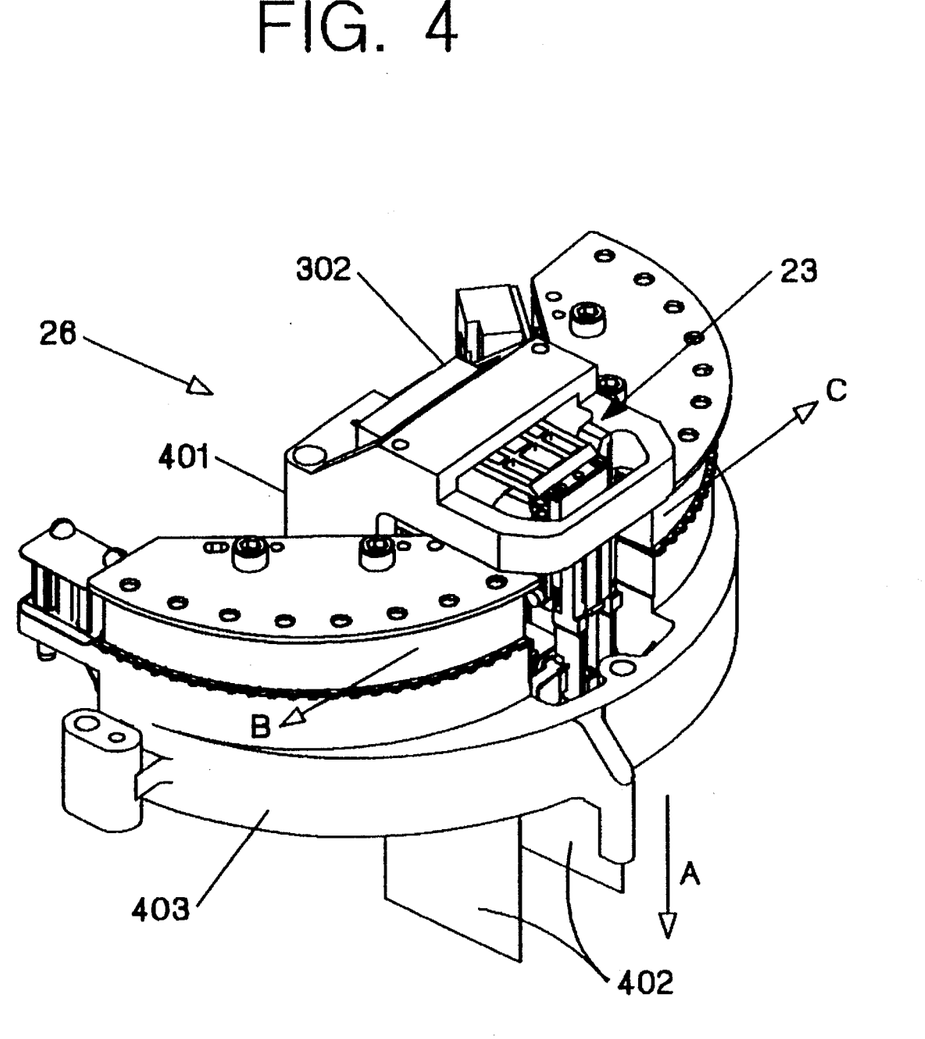
FIG. 4 is a perspective view of a head guide assembly having the head actuator assembly mounted therein according to a preferred embodiment of the present invention.

FIG. 4 depicts the head guide assembly 26 with the actuator assembly 23 secured to the base member 302, the base member 302 further coupled to a head guide support 403. Various brackets and screws secure the elements of the actuator assembly 23 together and various cables (including ribbon cables 402 for the head 308) interconnect the head 308, the coil 310 and the optical sensor 320 with the circuit cards 28 of the device 10. To reduce mechanical interference by the ribbon cables 402 with proper motion of the beam member 304, the ribbon cables 402 are preferably guided upwards along the sides of the beam member 304 and outwardly from the base member 302 by winged surfaces 322 inside the beam member 304 (FIG. 3).

In operation, when it is desired to access a particular set of tracks on the magnetic tape 17, the motion control 11 (FIG. 1) supplies a current to the coil 310. An electromagnetic field induced by the coil 310 interacts with the magnetic field of the magnets 303 to generate a force opposing a bias of the flexures 326 and 327 tending to maintain the beam member 304 in a primary position. The force urges the beam member 304, to which the coil 310 is secured, to move transversely along an axis A—A (FIG. 4) relative to the tape path (indicated by an axis B—B). When the actuator 23 is in a seek or index mode, a magnitude of the current supplied to the coil 310 will be relatively large to produce a relatively large beam member 304 displacement across one to three tracks (±240 microns), thus holding appropriate transducer elements opposite desired tracks. When the actuator 23 is in a track following mode, the servo loop, responding to position error signals from servo tracking elements in the head 308, makes very small, high frequency adjustments to the coil current to maintain precise transducer/track alignment (beam member 304 movement approximately ±four microns).

In general, the flexures or springs 326, 327 connecting the beam member 304 with the base member 302 should be sufficiently flexible to permit the desired degree of transverse movement of the head 308 but should be neither so flexible nor so rigid as to reduce the ability of the servo loop and head 308 to rapidly compensate for track mis-registration (TMR) as the magnetic tape 17 travels past the head 308. Excessively rigid connecting flexures also require a correspondingly excessive amount of current through the coil 310 to move the beam member 304, leading to stress and possible early failure of the flexures from fatigue. Additionally, the flexures should permit the indexing and tracking motion of the head 308 to be maintained substantially linear, without significant skew, such that the beam member 304, the base member 302 and the flexures 326, 327 represent a parallelogram during such motion. Moreover, the entire actuator assembly 23 should be highly resistant to shock, vibrations and reaction forces which would tend to generate torsional and other undesirable oscillations and motions in the head 308, thereby reducing the ability of the head 308 to accurately record and reproduce information onto and from the magnetic tape 17.

Achieving the desired track access operations described above, the moving head actuator assembly 23 has to meet several critical requirements, including: (a) minimizing a total moving mass of the head actuator assembly 23 while containing all necessary components; (b) compacting and balancing the head actuator assembly 23; (c) providing a very stiff assembly so as to act as a monolithic body; (d) avoiding resonant modes below, for example, 1600 Hz., except for a first mode in a direction of intended travel, which resonant mode should be below, for example, 40 Hz.; and (e) the head 308 needs to be held in alignment, for example, within a few microns while being clamped to resist, for example, up to thirty grams of shock and provide stability over wide temperature and humidity ranges.

Figure 5:
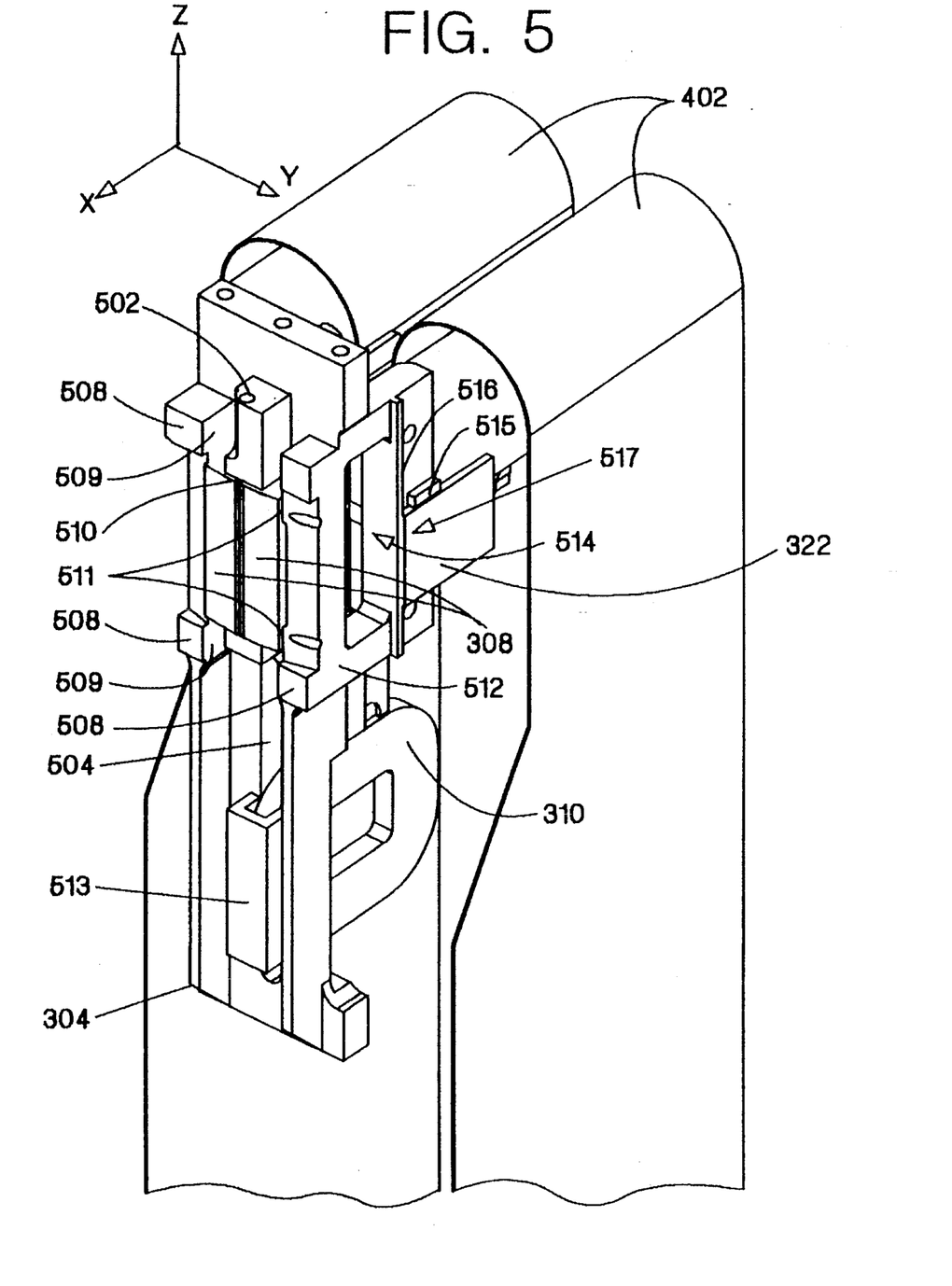
FIG. 5 is a perspective view of a top of a beam member holding a magnetic tape head therein according to a preferred embodiment of the present invention.

Referring now to FIG. 5, a top perspective view of the beam member 304 is shown including a beam body 504. The beam member 304 should be non-magnetic, and to increase the responsiveness and to reduce the amount of current through the coil 310 required to drive the beam member 304 and the components attached thereto, it is preferred that the beam member 304 be fabricated from aluminum or magnesium, and weighing, for example, approximately seven grams. Shown attached to the beam member 304 is the ribbon cables 402, the head 308 (comprised of left and right head modules), VCM coil 310, and indexing strip 322.

When the head actuator assembly 23 is attached to the head guide assembly 26, the head 308 must be accurately aligned in several planes. The beam member 304 aids in the alignment by providing pads 508 for allowing alignment tooling (not shown) to locate and establish an apex of the left and right head modules to within a few microns relative to a frontal plane Z. Similarly, pads 509 aid in aligning the head 8 in a lateral plane X, perpendicular to the frontal plane Z. Head 308 alignment in a vertical plane Y is accomplished by a surface 510 of a tape lifter block 502. The tape lifter block 502 additionally supplies a conduit for pressurized air to an air bearing surface of the left and right modules of the head 308.

The left and right modules of the head 308 are securely clamped against the lateral plane X by dual nibs 511 wherein a clamping force is provided by a tension beam 512 and transmitted to the dual nibs 511 by a bulkhead 517. Importantly, a rotation of the torsion beam 512 and the bulkhead 517 is isolated from transmitting a force to the indexing strip 322 by a slot 514. Hence, the indexing strip 322 can remain perpendicular to the frontal plane Z and thereby avoiding signal degradation from the optical sensor 320 (FIG. 3). A precise location of the indexing strip 322 is provided by stops 515 and 516, hence indexing alignment is built into the beam member 304. The VCM coil 310 is bonded to the beam member 304 through a channel 513 which achieves proper VCM coil 310 positioning as well as a large surface for rigidity.

A head actuator assembly with conventional thin, rectangular leaf springs interconnecting a beam to a base, may have a frequency response with a first natural frequency occurring at about 30 Hz., representing the combined spring/mass system of the actuator, and a second natural frequency occurring at about 500 Hz., representing the spring system alone as if the springs were fixed at each end. A tracking frequency of approximately 500 Hz. is desirable for the actuator assembly 23 to accurately follow tracks of a 128-track magnetic tape. The 30 Hz. first natural frequency of the conventional spring system may be sufficiently low and far from the operating frequency to be compensated or filtered out by the servo loop. The 500 Hz. second natural frequency is within range of servo operating frequencies and cannot be compensated or filtered without also degrading necessary information. Consequently, oscillations which interfere with precise tracking can occur.

Figure 6:
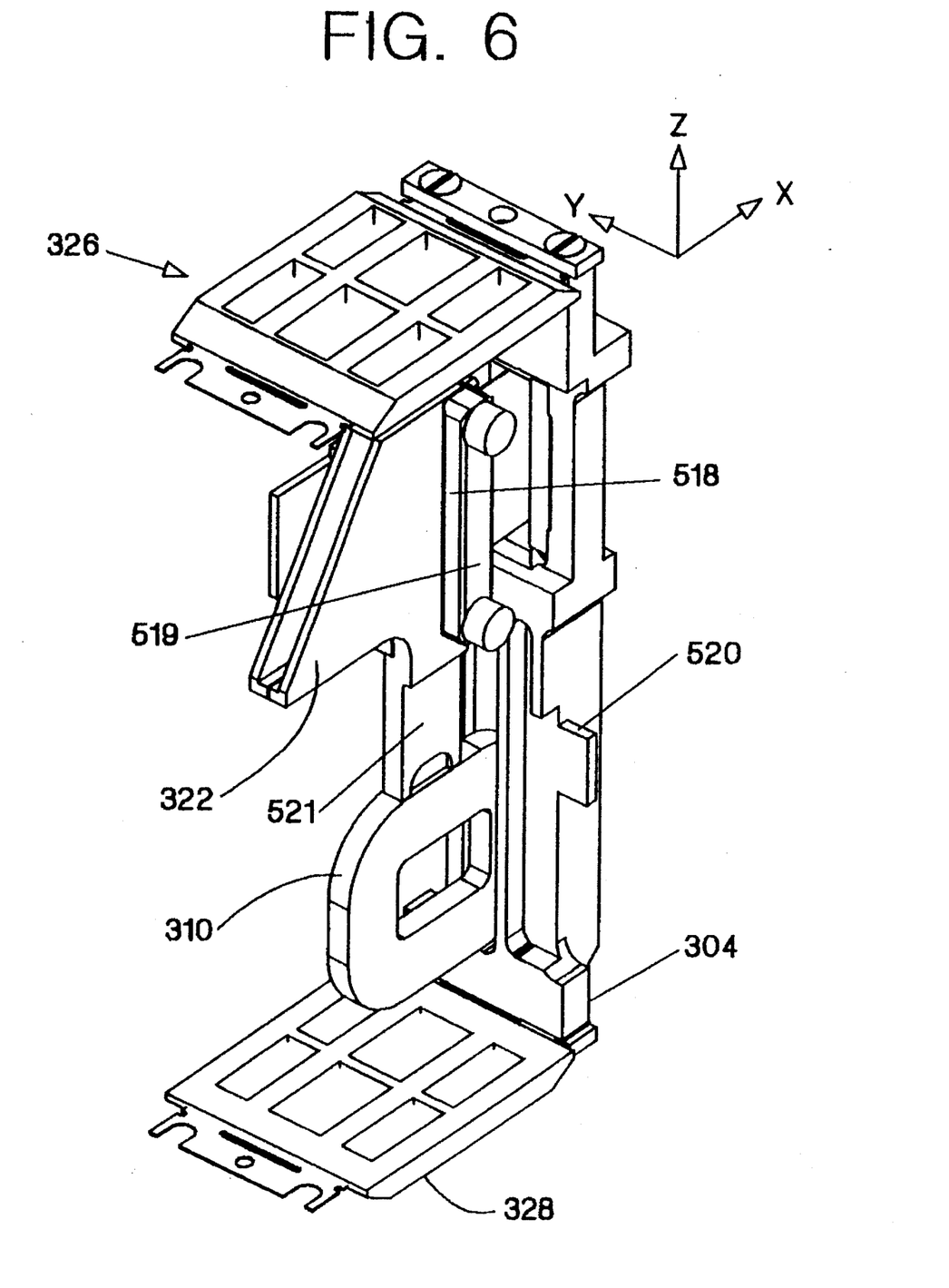
FIG. 6 is a perspective view of a bottom of the beam member of FIG. 5.

FIG. 6 depicts a bottom perspective view of the beam member 304 with flexures 326 and 328 attached thereto. The ribbon cables 402 (FIG. 4) provide electrical connection to the head 308 having, for example, a 0.0074 mm thickness and a 20 mm width for electrical and flexibility requirements. The ribbon cables 420 are clamped between spacers 518 and 519 for positioning and strain relief purposes. The spacers 518 extend into tie columns 521 fully contacting and bonding with an upper portion of the VCM coil 310. A collinear tie is thus created between a center of the VCM coil 310 and the strain relief structure (spacers 518, 519), thus avoiding bending moments around the VCM coil 310 mass and the strain relief structure mass of the beam body 504. An effect of the tie columns 521 is to modify a bending mode resonance at mid-beam body 504 from about 300 Hz. to over 1500 Hz. Furthermore, the tie columns 521 serve as a supporting base for the head 308.

The spacers 518 additionally have trapezoidal extensions 322 (hereinafter referred to as wings 322) for preserving an inner spacing uniformity to prevent the ribbon cables 402 from rubbing . . . . Friction caused by the ribbon cables 402 would present an undesired unstable spring force rendering a transfer function of the flexures 326, 328 unusable. The wings 322 serve a second function of holding ribbon cables 402 contacting ends via bonding, for avoiding warping and creating a well behaved curvature as the ribbon cables 402 flex during head actuator assembly 23 operation. Low frequency resonances are avoided by use of the wings 322.

A tab 520 contacts dual pre-loaded cantilever springs (not shown) in the head actuator assembly 23, the cantilever springs supplying cushioned limits to the beam member 304 (crash stops). The crash stops in combination with the tab 520 provide a home position reference for the head 308, wherein the optical sensor 320 can be initialized for repeatable reckoning within, for example, five microns. The crash stops are designed to move less than two microns when loaded under fifty grams, but will deflect as a spring when loaded over 150 grams.

The actuator assembly 23 is mechanically decoupled from the balance of the device 10, thus reducing the adverse effects of external vibrations on the beam member 304 and the adverse effects of vibrations from the beam member 304 on other components of the device 10, in part, by using the base member 302 fabricated from a massive material. However, to prevent the base member 302 from magnetically interacting with the electromagnetic assembly 300 and interfering with the head 308, the base member 302 should be non-magnetic. Preferably, the base member 308 should be fabricated from brass, weighing, for example, about three-hundred grams.

Figure 7:
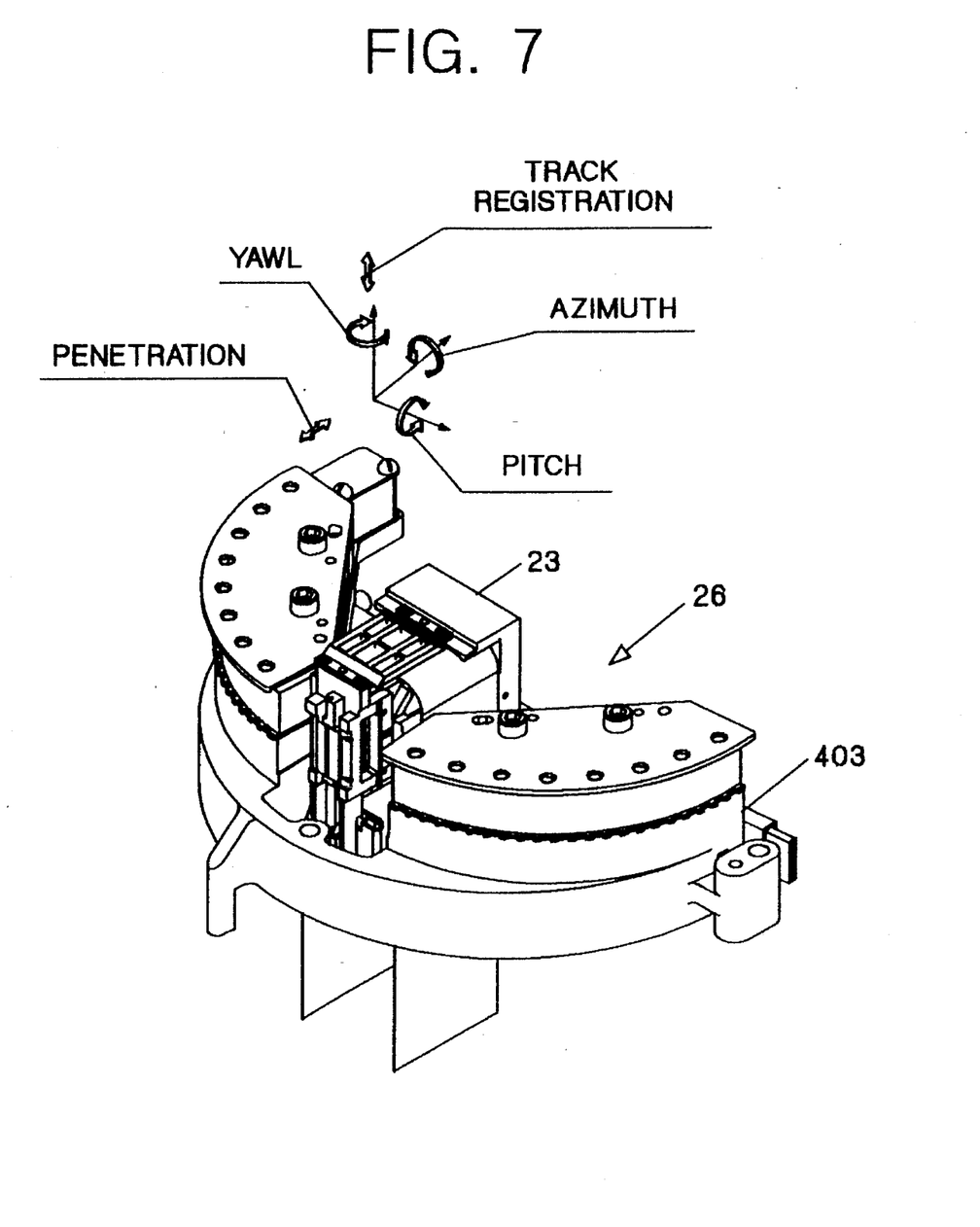
FIG. 7 is a perspective view of the head guide assembly showing the several directions of force relative to the magnetic tape head.

FIG. 7 diagrams several possible force directions for making precise adjustments to the head 308 that operate directly upon the head actuator assembly 23 relative to the head guide support 403. The several adjustment force directions include penetration (for wrap angle adjustment), azimuth or skew, yawl, pitch, and track registration (home position). The head guide assembly 26 not only provides a platform for the head 308 for support, but also for movement during alignment and up/down track-to-track movement via the head actuator assembly 23 (typically tens of microns), and track following movement (typically several microns). The head guide assembly 26 is required to move up/down under control unit 4 command while rejecting external sources of excitation so that recording and reading operations are not disrupted.

Figure 8:
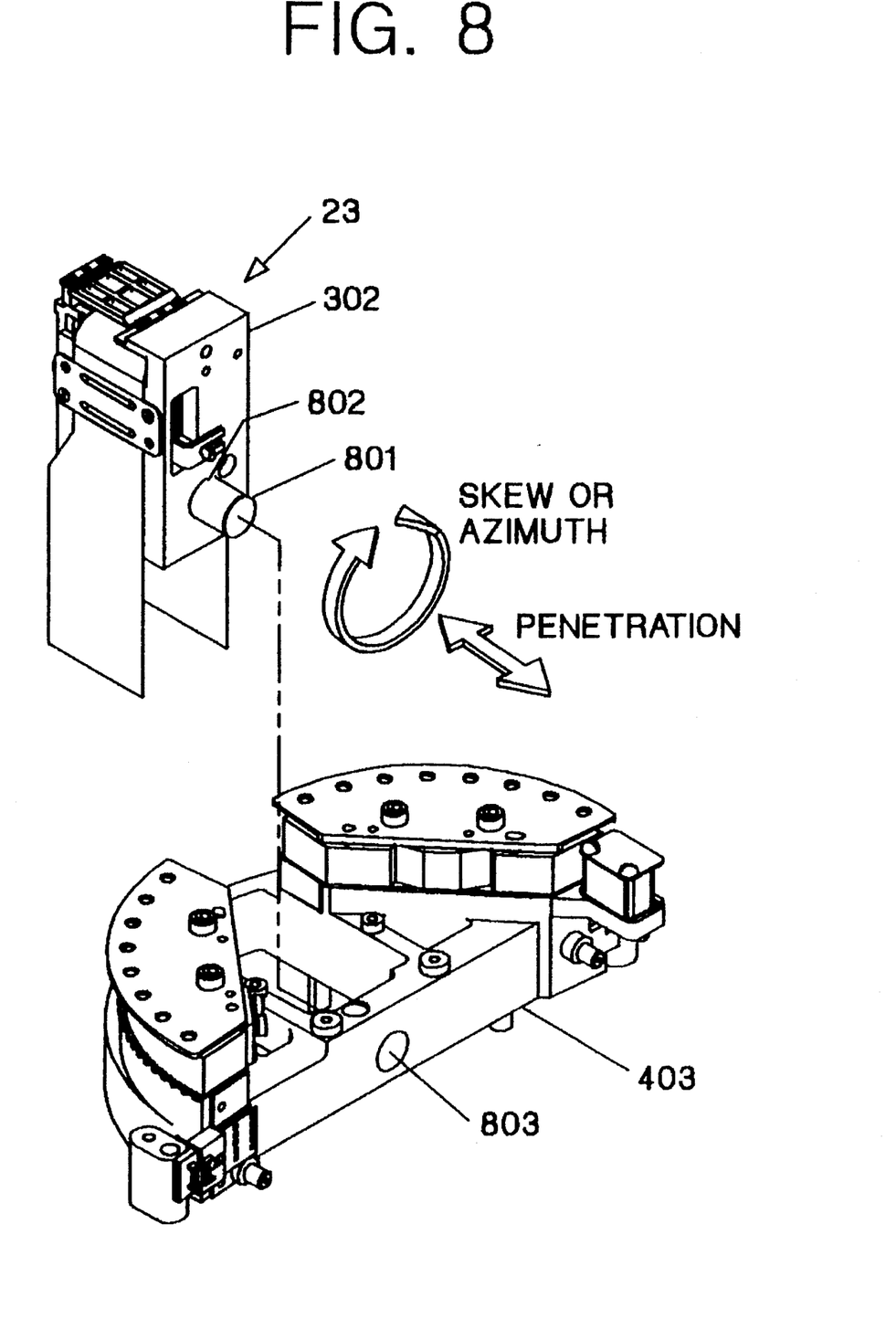
FIG. 8 is an exploded view showing a mounting relationship between the actuator assembly and the head guide support according to a preferred embodiment of the present invention.

FIG. 8 shows a relationship of the head actuator assembly 23 to the head guide support 403 before assembly. The head 308 is positioned for yawl, pitch, and track registration by the beam member 304 as coupled to the base member 302. Two critical adjustments, penetration and skew, are made after coupling the actuator assembly 23 to the head guide support 403. The head actuator assembly 23 is coupled to the head guide housing 403 by a kingpin 801 which is inserted into a hole 802 of the base member 302 and further into a hole 803 of the head guide support 403. The head actuator assembly 23 acts as a joystick rotating about the kingpin 801 for making the skew/azimuth adjustment, and further, the head actuator assembly 23 penetrating in/out of the hole 803 for making a penetration or wrap angle adjustment. The kingpin 801 also serves as a structural support of the base member 302, being made of a high modulus material for vibration isolation purposes, for example, steel or ceramic. The penetration and wrap angle alignments are made to an accuracy of a few microns and the kingpin 801 must therefore be tightened or locked after alignment with minimal movement (ideally no movement).

Figure 9:
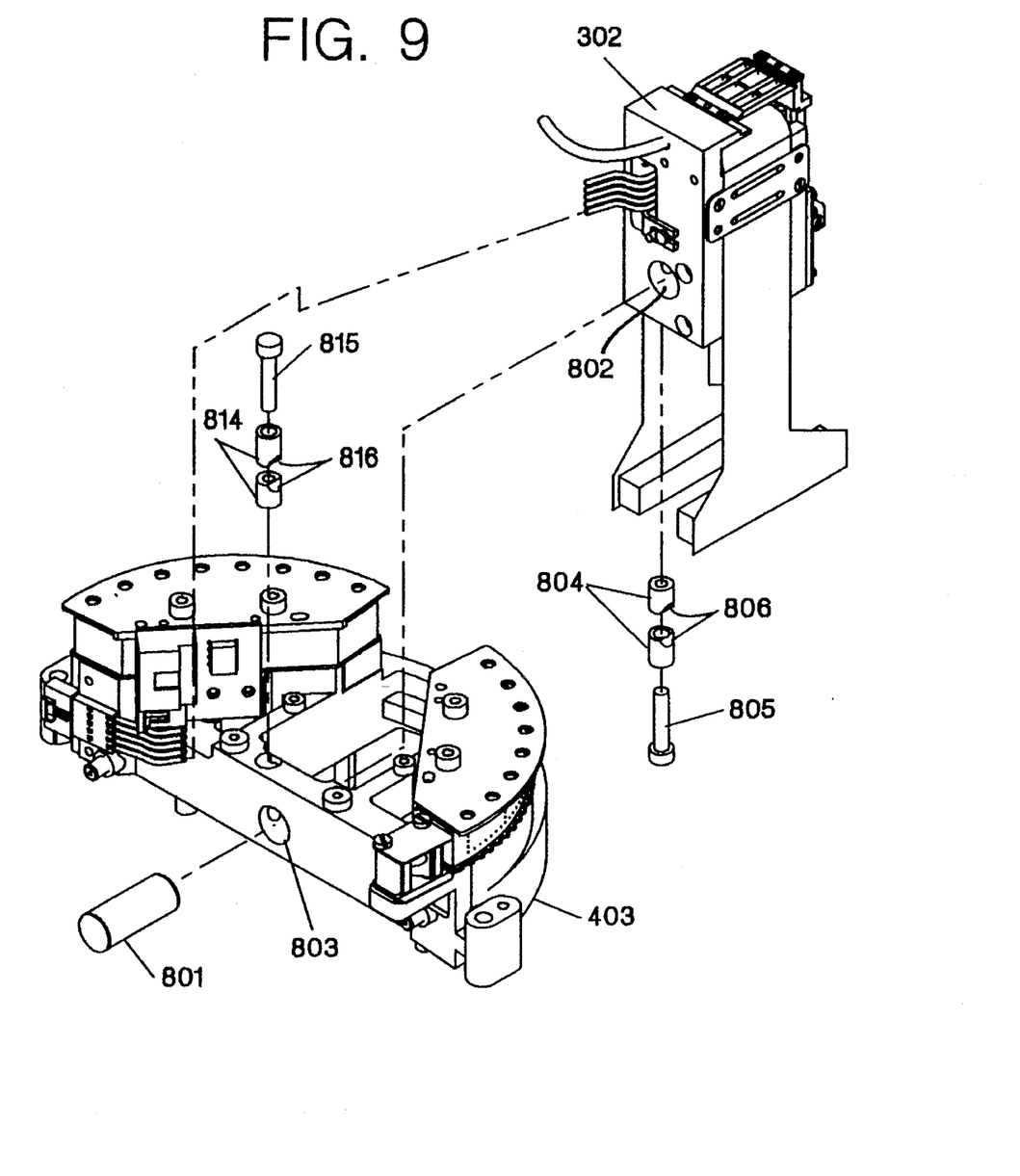
FIG. 9 is an exploded view of the actuator assembly and the head guide support depicting a kingpin and locking mechanism therefore according to a preferred embodiment of the present invention.

FIG. 9 provides additional details regarding tightening the kingpin 801 to the head guide support 403 and the base member 302. Two wedge pins 804 are inserted into a hole adjacent to hole 802 such that each wedge pin 804 has a substantially flat surface 806 (opposing flat surfaces) tangentially facing a curved surface of the kingpin 801, the opposing flat surfaces 806 wedging a radius of the curved surface of the kingpin 801 therebetween. A screw 805 is threaded through the wedge pins 804 so that as the screw 805 is tightened, the wedge pins 804 are drawn towards each other causing the opposing flat surfaces 806 to contact the curved surface of the kingpin 801, thus tightening the kingpin 801 in the hole 802 without substantial movement of the kingpin 801, thus maintaining the critical skew adjustment. The kingpin 801 is similarly tightened to the head guide support 403 via screw 815 and wedge pins 814, each wedge pin 814 having an opposing flat surface 816, without substantially affecting the penetration adjustment.

Figure 10:
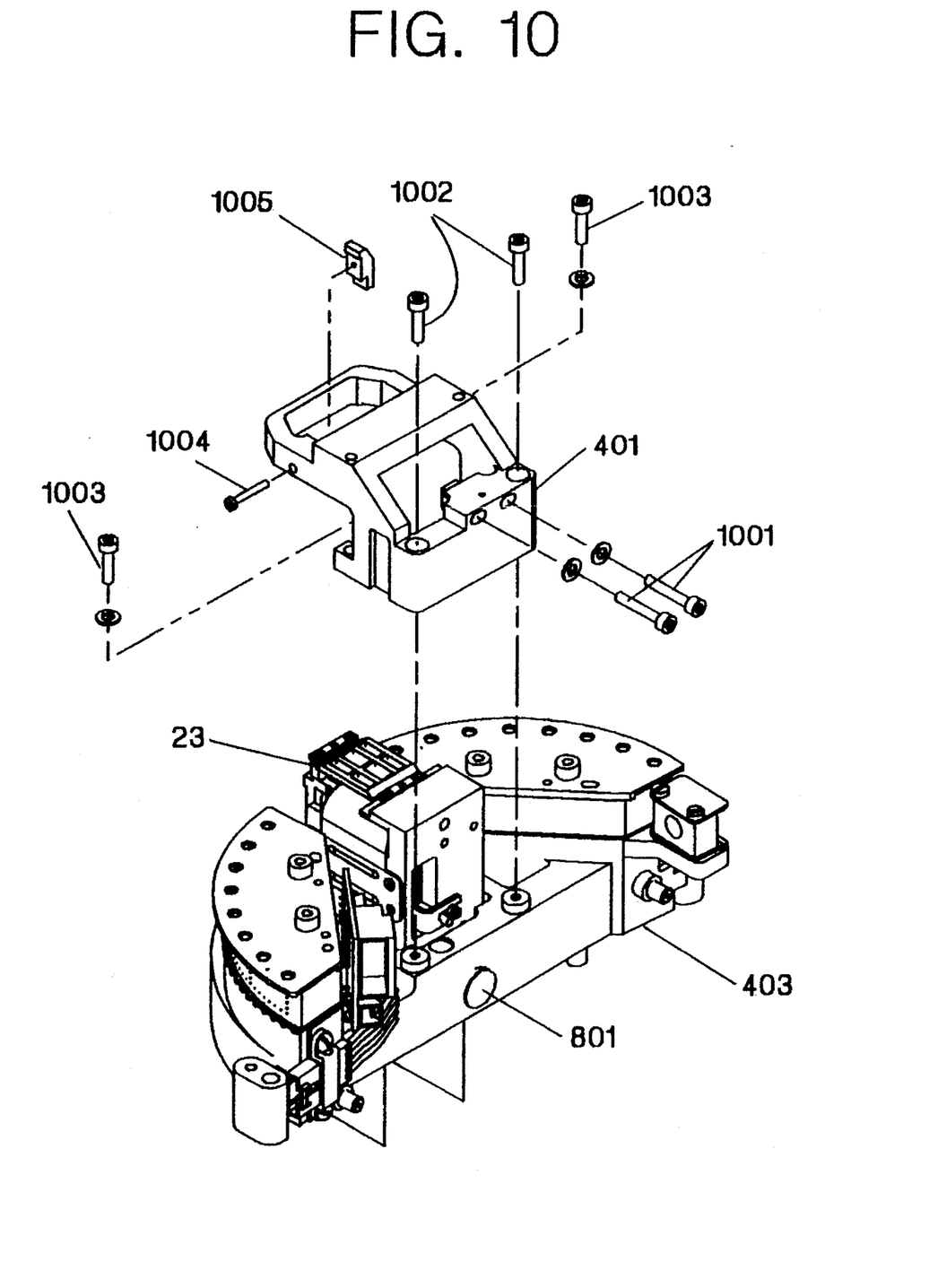
FIG. 10 is an exploded view showing a relationship between an outhouse assembly and the head guide support according to a preferred embodiment of the present invention.

Referring now to FIG. 10, an outhouse assembly 401 is shown, with the appropriate screws 1001 through 1004, relative to the head guide support 403. Although the base member 302, kingpin 801, and head guide support 403 are designed to minimize shock and resonances to the head 308, still further reductions to resonances in the pitch direction are desired. A rocking mode type of excitation (pitch) is induced by movement of the head 308 up and down while accessing different track groups, or by vibration external to the head guide assembly 23. The outhouse assembly 401 further connects and reinforces the base member 302 for improving resonance stability by reducing a response peak (Q) for compensation. Once again, the critical alignments for penetration and skew cannot be affected by the additional reinforcement provided by the outhouse assembly 401.

Therefore, the outhouse assembly 401 is designed in a manner to not affect the actual physical alignment. The outhouse assembly 401 provides reinforcement to a backside of the base member 302 as well as to a side of the base member 302 near the optical position sensor 320.

Minimum disturbance to the head actuator assembly 23 is ensured by following a predefined tightening sequence of the screws 1001 through 1004. First, the outhouse assembly 401 is attached to a backside of the base member 302 by screws 1001. Second, the outhouse assembly 401 is attached to a first point on a front face of the head guide support 403 by front screws 1002, the front screws 1002 being substantially perpendicular to the screws 1001. The outhouse assembly 401, at this point, adds structural strength for opposing a pitch motion of the head actuator assembly 23. Next, two back screws 1003 are tightened for attaching the outhouse assembly 401 to a second point on the front face of the head guide support 403, the second point being substantially on a same plane (parallel to) as the first point of the front face. Attaching the outhouse assembly 401 at a second location to the head guide assembly 403 causes the head guide assembly 403 to further resist a pitch motion since such a motion would try to twist the head guide support 403 into itself. Lastly, the screw 1004 is tightened, in conjunction with a clamp 1005 for securing a side of the beam member 302.

The head guide assembly 26 may be subjected to many sources of vibration and shock which can affect data reading and recording performance, especially in terms of servo tracking of the tape head 308 against a pre-recorded track on the tape 17. Sources of vibration and shock come from shipping, a robot traveling and passing by the device 10 (a robot may be used for selecting and removing tape cartridges), opening and closing frame/rack doors and sides of the drive 10, and earthquakes or other acts of God. Isolating the head guide assembly 26, and hence the tape head 308, is accomplished by floating the device 10 via shock mounts. Such shock mounts are designed to introduce a very low natural frequency of vibration for providing shock/vibration isolation beyond the natural frequency of vibration of the shock mounts while able to supporting a weight of the device 10. Additionally, the shock mounts provide a sway space in all directions for the device 10.

Figure 11:
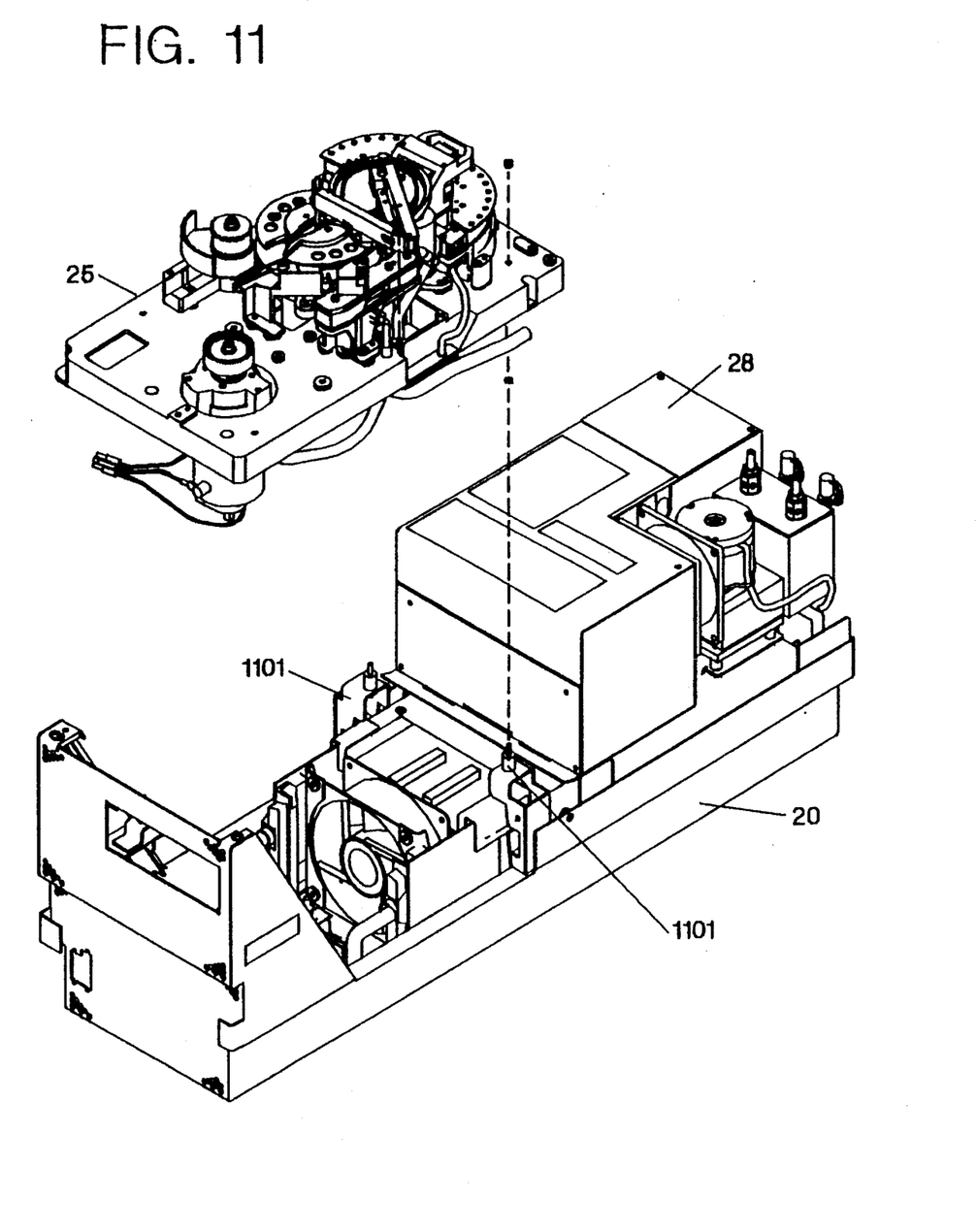
FIG. 11 is a perspective view of a tape device as mounted on a chassis having shock mounts for isolation therebetween.

FIG. 11 shows shock mounts 1101 as supported by the base unit 20 for shock isolating the deck assembly 25. The shock mounts 1101 are stud mounted type shock mounts for assembly ease. Four shock mounts 1101 (two shown) are positioned approximately equidistant from the a center of gravity of the deck assembly 25, with each shock mount 1101 supporting, for example, approximately sixty seven kilograms.

Figure 12:
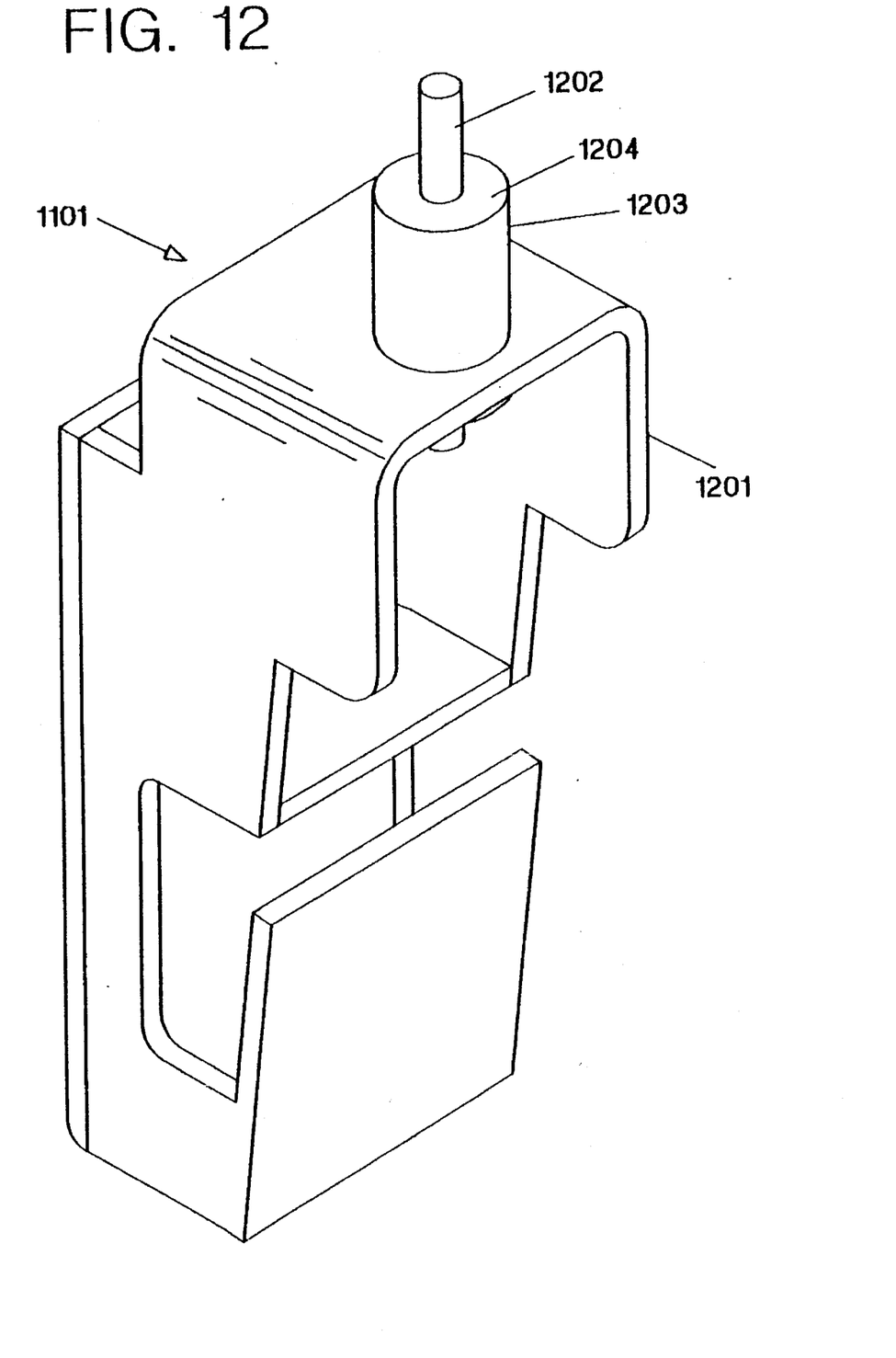
FIG. 12 is perspective view showing a shock mount of FIG. 11 in greater detail.

FIG. 12 shows a shock mount 1101 in greater detail. The shock mount 1101 is held by a stud 1202 to a sheet metal pedestal structure 1201, for example, 2.5 mm thick (though a solid pedestal would also be appropriate). Each pedestal structure 1201 is separated by vertical walls of the base unit 20 thereby providing high stiffness in the direction of interest. The shock mount 1101 is made up of two layers, including a harder outer layer 1203 which behaves spring like, for example, a neoprene material, and an inner layer 1204 made of a softer viscoelastic material for damping purposes. The shock mounts 1101 provide a natural frequency of vibration, for example, of 31 Hz. Additionally, a vertical sway of 3 mm and a horizontal sway of 1 mm is achieved.

In summary, a tape device for reading from and writing data to a multi-track tape via a servo controlled tape head, wherein the servo controlled magnetic tape head is critically aligned for skew and wrap angle, and wherein the tape device provides shock isolation and reduced resonances to the magnetic tape head has been described. The tape device includes: a data control circuit for sending data to and receiving data from the magnetic tape head, and a motion control circuit for servoing the magnetic tape head. A massive, non-magnetic base member is provided for reducing resonances to the magnetic tape head. A lightweight, non-magnetic beam member is movably attached to the massive base member for allowing the magnetic tape head mounted thereon to index perpendicularly relative to a tape path, the lightweight beam member having a plurality of pads for accurately establishing magnetic tape head alignment in frontal and lateral planes. A head guide support is made having a super gusseted structure for structurally supporting the massive base member. A kingpin rotatably and penetratably mounts the massive base member to the head guide support such that the massive base member, in a joystick fashion, is rotated about the kingpin for skew aligning the magnetic tape head, and further penetrates the kingpin within the head guide support for wrap angle aligning the magnetic tape head. A first wedge clamp having opposing and substantially flat surfaces for tangentially wedging a curved surface of the kingpin thereby locking the kingpin to the massive base member without substantially moving the massive base member. A second wedge clamp also having opposing and substantially flat surfaces for tangentially wedging the curved surface of the kingpin thereby locking the kingpin to the head guide assembly without substantially moving the kingpin. An outhouse assembly further ties the massive base member to the head guide support without substantially affecting the tape head alignment, wherein the outhouse assembly reduces a pitch resonance of the tape head, the outhouse assembly attaching to a backside of the massive base member perpendicularly to a front face of the head guide support. The outhouse assembly furthermore attaches to a side of the massive base member. A deck assembly supports the head guide assembly within the tape device.

While the invention has been particularly shown and described with reference to preferred embodiments thereof, it will be understood by those skilled in the art that various changes in form and details may be made therein without departing from the spirit and scope of the invention. For example, various changes may be made to certain materials as long as the critical requirements are met, for example, weight, strength, magnetic orientation, etc. Still further, means for attaching structures together may be changed without departing from the scope of the invention.

What is claimed is:

1. A servo controlled magnetic tape head guide assembly for reading data from and writing data to a magnetic tape, wherein a magnetic tape head therein is critically aligned for skew and wrap angle, said magnetic tape head guide assembly providing shock isolation and reducing resonances to said magnetic tape head, said magnetic tape head guide assembly comprising:

a massive base member;

a lightweight beam member movably attached to said massive base member for allowing said magnetic tape head mounted on said lightweight beam member to index perpendicular to a tape path;

a head guide support having a super gusseted structure;

a kingpin for rotatably and penetratably mounting said massive base member to said head guide support such that said massive base member, in a joystick fashion, is positioned with said kingpin for skew and wrap angle alignment of said magnetic tape head;

a first wedge clamp for locking said kingpin to said massive base member; and a second wedge clamp for locking said kingpin to said head guide support wherein said first and second wedge clamps lock said kingpin via opposing flat surfaces of each of said first and second wedge clamps, said opposing flat surfaces mating tangentially to a radius of an outer surface of said kingpin.

2. The head guide assembly according to claim 1 further comprising an outhouse assembly for further attaching said massive base member to said head guide support without substantially affecting the tape head alignment.

3. The head guide assembly according to claim 2 wherein said outhouse assembly reduces a pitch resonance of the tape head.

4. The head guide assembly according to claim 3 wherein said outhouse assembly attaches to a backside of said massive base member perpendicularly to a front face of said head guide support, said outhouse assembly further attaching to a side of said massive base member.

5. The head guide assembly according to claim 4 wherein the tape head alignment is substantially unaffected by locking said first and second wedge clamps.

6. The head guide assembly according to claim 5 wherein said beam member includes a plurality of pads for accurately establishing tape head alignment in frontal and lateral planes.

7. The head guide assembly according to claim 5 further comprising a deck assembly for supporting said head guide assembly.

8. The head guide assembly according to claim 7 further comprising a plurality of shock mounts for supporting said deck assembly thereon for providing a sway space in all directions for said deck assembly and providing shock isolation therefore, said shock mounts including a hard spring like outer layer and a softer viscoelastic inner layer.

9. A tape device for reading from and writing data to a multi-track tape via a servo controlled magnetic tape head, wherein the servo controlled magnetic tape head is critically aligned for skew and wrap angle, said tape device providing shock isolation and reducing resonances to said magnetic tape head, said tape device comprising:

a data control circuit for sending data to and receiving data from said magnetic tape head;

a motion control circuit for servoing said magnetic tape head;

a massive base member for reducing resonances to said magnetic tape head;

a lightweight beam member movably attached to said massive base member for allowing said magnetic tape head mounted on said lightweight beam member to index perpendicular to a tape path, said lightweight beam member having a plurality of pads for accurately establishing magnetic tape head alignment in frontal and lateral planes;

a head guide support having a super gusseted structure for supporting said massive base member;

a kingpin for rotatably and penetratably mounting said massive base member to said head guide support such that said massive base member, in a joystick fashion, is rotated about said kingpin for skew aligning said magnetic tape head, and further penetrating said kingpin within said head guide support for wrap angle aligning said magnetic tape head;

a first wedge clamp having opposing flat surfaces tangentially mating a curved surface of said kingpin for locking said kingpin to said massive base member without substantially moving said kingpin;

a second wedge clamp having opposing flat surfaces tangentially mating the curved surface of said kingpin for locking said kingpin to said head guide support without substantially moving said kingpin;

an outhouse assembly for further attaching said massive base member to said head guide support without substantially affecting the tape head alignment, wherein said outhouse assembly reduces a pitch resonance of the tape head, said outhouse assembly attaching to a backside of said massive base member perpendicularly to a front face of said head guide support, said outhouse assembly further attaching to a side of said massive base member; and a deck assembly for supporting said head guide support.

10. The head guide assembly according to claim 9 further comprising a plurality of shock mounts for supporting said deck assembly thereon for providing a sway space in all directions for said deck assembly and providing shock isolation therefore, said shock mounts including a hard spring like outer layer and a softer viscoelastic inner layer.

* * * * *